May 7, 1963   R. L. DEAL   3,088,767
HANDLE FOR CANS, BOTTLES AND THE LIKE
Filed May 8, 1961   2 Sheets-Sheet 1
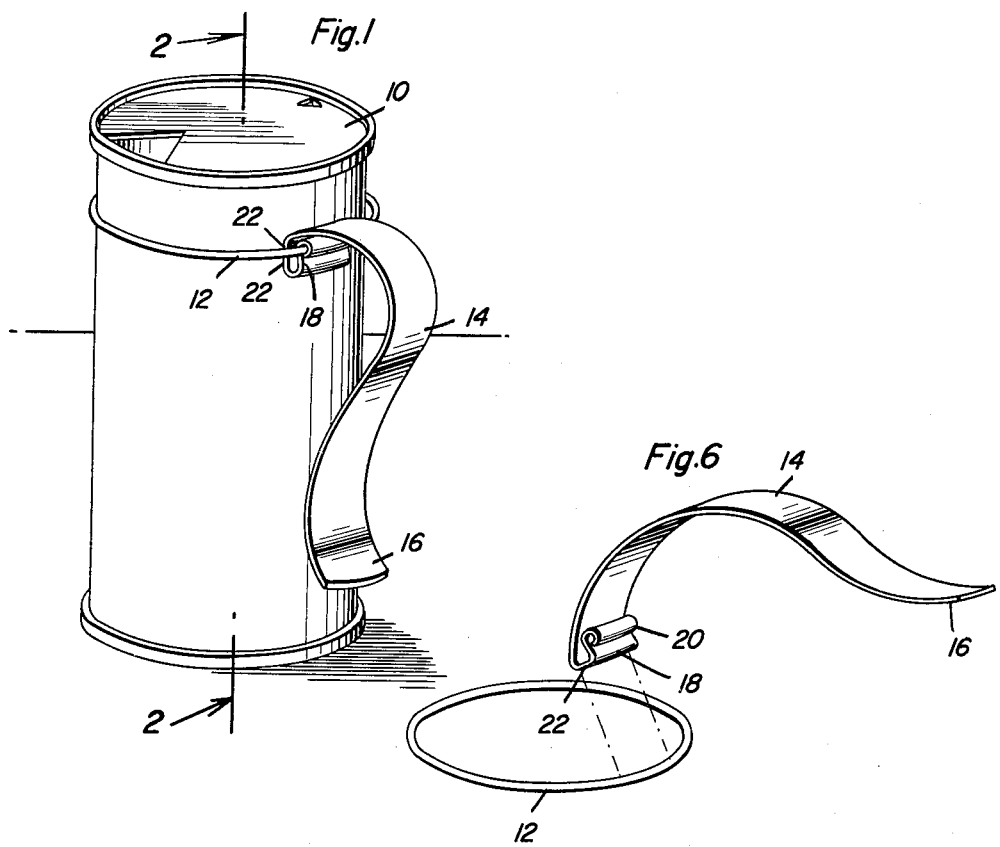
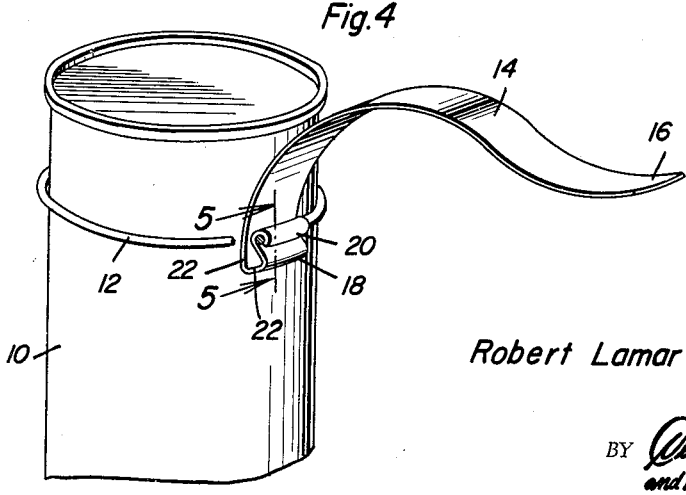
Robert Lamar Deal
INVENTOR.

May 7, 1963   R. L. DEAL   3,088,767
HANDLE FOR CANS, BOTTLES AND THE LIKE
Filed May 8, 1961   2 Sheets-Sheet 2
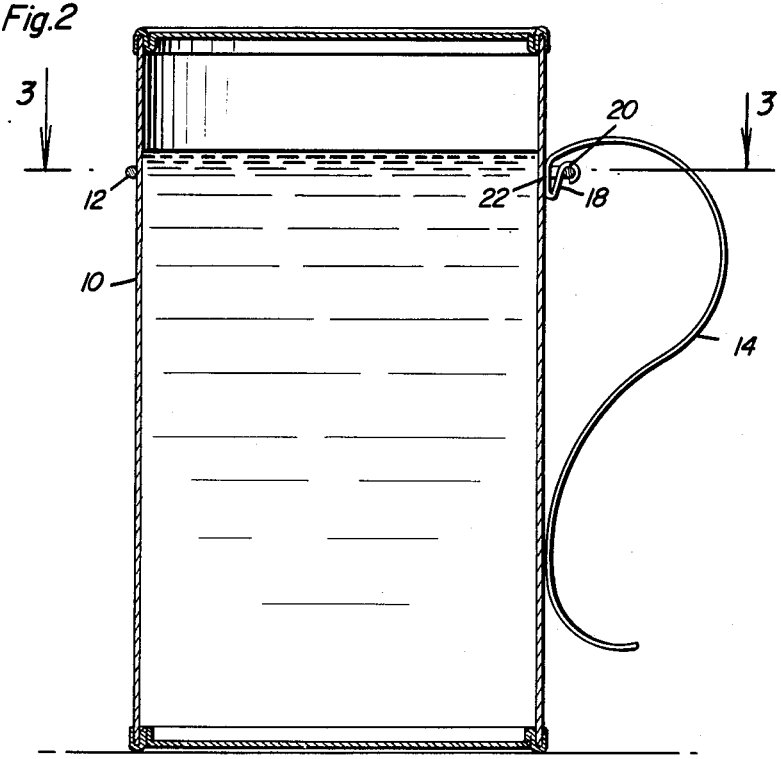
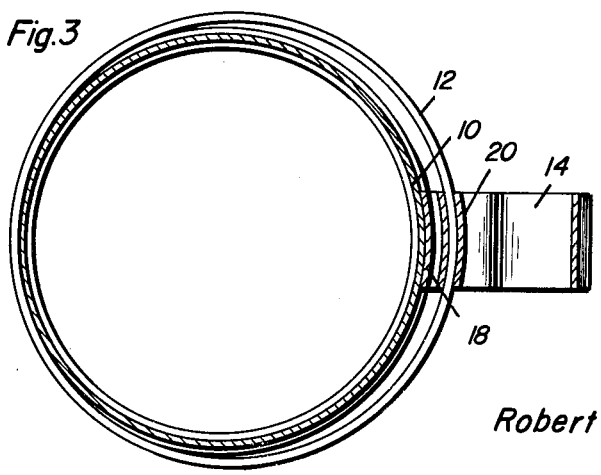
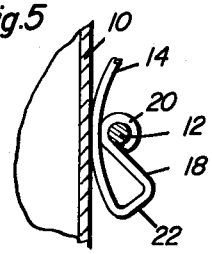
Robert Lamar Deal
INVENTOR.

United States Patent Office 3,088,767
Patented May 7, 1963

3,088,767
HANDLE FOR CANS, BOTTLES AND THE LIKE
Robert Lamar Deal, 3318 W. Markham, Little Rock, Ark.
Filed May 8, 1961, Ser. No. 108,617
7 Claims. (Cl. 294—31.2)

This invention comprises a novel and useful handle for cans, bottles and the like and more particularly relates to an easily attached or removed handle which may be advantageously applied to containers such as cans, bottles and the like to facilitate the pouring of the contents from such containers.

The primary purpose of this invention is to provide a handle assembly which may be readily attached to various types of containers to facilitate pouring the contents from the containers or using the containers as drinking vessels and the like.

A further object of the invention is to provide a handle assembly which shall be of an extremely simple and inexpensive construction.

A still further object of the invention is to provide a handle assembly in accordance with the foregoing objects which shall emphasize the simplicity of construction and the facility by which it may be applied to or removed from a container and yet wherein an effective, securely attached and unobtrusive handle may be provided thereby.

Yet another object of the invention is to provide a handle assembly in accordance with the above-mentioned objects which may be inherently capable of use with containers of different sizes and shapes.

Yet another purpose of the invention is to provide a handle assembly according to the above-mentioned objects which shall consist of but two elements, one comprising a ring-like bail for encircling the container and the other comprising a one-piece handle quickly attachable to the bail and by means of a camming or wedging action effecting a secure non-slip engagement of the handle to the container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a preferred embodiment of the handle assembly of this invention applied to a can in its operative position thereon;

FIGURE 2 is a view in vertical central section through the container of FIGURE 1 and taken substantially upon the plane indicated by the section line 2—2 of FIGURE 1 and showing the handle in its operative position upon the container;

FIGURE 3 is a horizontal sectional view taken substantially upon the plane indicated by the section line 3—3 of FIGURE 2;

FIGURE 4 is a fragmentary perspective view of the upper portion of the container of FIGURE 1 and showing the handle in the position in which the bail may be applied to or removed from the container;

FIGURE 5 is a detail view taken in vertical section substantially upon the plane indicated by the section line 5—5 of FIGURE 4; and FIGURE 6 is an exploded perspective view of the bail and the handle in separated position.

In the accompanying drawings the numeral 10 designates generally any suitable type of container to which the handle assembly of this invention may be applied. As illustrated the container may consist of a beer can although it will be readily appreciated that the particular type of handle assembly illustrated will readily accommodate itself to other cylindrical containers such as glasses, bottles and the like. Further, by appropriately shaping the bail member of the handle assembly it may be readily used with containers of a non-circular cross-sectional configuration.

Indicated by the numeral 12 is the bail or attaching means of the assembly while the numeral 14 designates the handle component of the assembly.

In the form of the invention illustrated in the accompanying drawings the bail 12 is shown as being constructed of a single wire-like ring 12 although as above-mentioned other configurations may be given to the bail as determined by the configuration of the container with which the handle is to be used. It is contemplated that the bails may be made of different sizes, each adapted to fit and loosely embrace a limited range of sizes of containers with which the same handle 14 may be used so that by using a given handle and a selected one of a series of bails, the handle assembly may be adapted to fit a wide variety of sizes of containers.

The handle 14 preferably comprises a single flat strip of metal of a suitable rigidity and stiffness, although some yieldability in the material will be desirable as will be later apparent. This handle is given as shown in FIGURES 1 and 6 a generally S-configuration with one extremity being particularly adapted for engagement and cooperation with the bail 12, while the other extremity has a reversely curved end 16 which will curve away from the side of the container as will be best apparent from FIGURE 2.

The extremity of the handle which is to be attached to and cooperate with the bail 12 is curved back upon itself as at 18 and it is again curved back upon itself as at 20.

The curved portion 18 is joined to the main body of the handle 14 by a substantially flat portion 22 which comprises a wedging or camming element, while the further reversely curved bead-like portion 20 constitutes a hinge which is adapted to embrace the bail 12 therein as will be best apparent from a consideration of FIGURES 1–5. It will be observed that the bead-like hinge portion 20 has a sufficiently wide opening between its edge and the adjacent surface of the return portion 18 to provide a passageway through which the bail 12 may be readily passed.

In operation a selected size of bail 12 in accordance with the container to which the handle is to be applied is inserted in the passageway above mentioned and moved into the hinge portion 20 from the position shown in FIGURE 6 to that shown in FIGURES 4 and 5. With the handle now in a substantially horizontal or raised position as indicated in FIGURES 4 and 5, the bail is now slid upon the end of the container. This is readily effected since the bail is sufficiently larger than the container to receive the single thickness of flat material of the handle which lies inside the bail as shown in FIGURE 5 between the bail and the container. At this time the parts will be in the position shown in FIGURE 5 and with the bail loosely embracing the can about its circumference. With the bail positioned at the proper portion along the can, the handle is then tilted downwardly about the hinge connection established by the reception of the bail 12 within the cylindrical bead or hinge portion 20. This downward pivoting movement will cause an upward swinging movement of the cam or wedge portion 22, forcing the latter between the bail and the can. As this operation occurs, the bail will be stretched or tightened about the can since that side of the bail to which the handle is engaged will be forcibly moved away from the can into the position shown in FIGURE 3. This will cause the bail to tightly frictionally engage the can so that the can is firmly supported in a secure manner by the handle assembly. It will be observed that at this time the lower end of the handle is now flat against the side of the can as shown in FIGURES 1 and 2 while the flat member 22 is in stable position against the can. This is a stable or secure position of the swingable handle since the tension applied to the bail is tending to draw the hinge portion 20 of the handle towards the can. Any further turning of the handle away from its engaged position tends to increase this distance owing to the spacing of the axis or centerline through the bead 20 from that portion of the handle which lies immediately between this centerline and the surface of the can.

This operation is assisted by the inherent stiffness or relatively slight resiliency of the handle, so that the slight distortion of the portions 20 and 18 will serve to maintain and impart a desired resilient force to the bail tending to maintain the same taut upon the can.

Although the bail 12 has been shown as a wire-like or rod-like continuous element, it is readily appreciated that it may be of different materials, and of different cross sectional shape as required and as best suited to attachment to and engagement with a particular type of container.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A handle assembly for elonagted containers comprising a resiliently deformable bail of sufficient internal area and shape to loosely embrace a container, a handle detachably secured to said bail by a pivot portion and having a camming surface disposable between said bail and container upon pivoting of said handle on said bail and operable to tension the bail into a frictional, compressively embracing engagement of said container, said bail comprising an endless, continuous ring-like element, said handle having its end inturned upon itself to provide a loop with an entrance opening for the passage of said bail into said loop, said pivot portion being so positioned relative to said camming surface that said handle is movable to an overcenter position when said bail is tensioned, said handle and said bail comprising the sole support for lifting said container.

2. The combination of claim 1 wherein said handle comprises a single elongated member having at one end a curved portion defining said camming surface for engaging a container within the bail.

3. A removable handle assembly for cylindrical containers comprising a retaining member consisting of a wire ring of a resiliently deformable material and a handle operatively associated therewith, said retaining member being of a sufficient size and of sufficient resiliency to loosely embrace a container for application to or removal therefrom when untensioned and to frictionally and securely grip the container under compression when tensioned, said bail comprising an endless, continuous ring-like element, said handle having its end inturned upon itself to provide a loop with an entrance opening for the passage of said bail into said loop, said handle having pivot means for detachably embracing said retaining member and having a tensioning means connected to said pivot means and cooperating with the bail and container when interposed therebetween for tensioning said bail, said further means having an over-center relation with said pivot means for stably securing said handle in locking position.

4. The combination of claim 3 wherein said tensioning means constitutes a means for mouting said pivot means on said handle, said handle and said pivot means comprising a single strip of metal.

5. The combination of claim 4 wherein said pivot means and said tensioning means comprise reversely curving portions at one end of said handle.

6. The combination of claim 5 wherein said tensioning means has a greater radius than does said pivot means to thereby effect a cam action of said tensioning means on a container upon pivoting of said handle about said retaining member by said pivot means.

7. The combination of claim 3 wherein said retaining member and handle comprise the sole support for said container.

References Cited in the file of this patent

UNITED STATES PATENTS

| 2,474,913 | Propst | July 5, 1949 |
| 2,626,174 | Barber | Jan. 20, 1953 |
| 2,742,315 | Dreier | Apr. 17, 1956 |
| 2,765,969 | Bennington | Oct. 9, 1956 |
| 2,928,570 | Fitch | Mar. 15, 1960 |

FOREIGN PATENTS

| 44,749 | Denmark | of 1931 |
| 556,795 | Great Britain | Oct. 21, 1943 |